United States Patent [19]

Akhter

[11] Patent Number: 4,827,603
[45] Date of Patent: May 9, 1989

[54] METHOD OF MAKING A BLOW MOLDED FLOAT SWITCH ASSEMBLY

[75] Inventor: Pervez Akhter, Fort Wayne, Ind.

[73] Assignee: The Scott & Fetzer Company, Fort Wayne, Ind.

[21] Appl. No.: 142,516

[22] Filed: Jan. 7, 1988

Related U.S. Application Data

[62] Division of Ser. No. 27,360, Mar. 18, 1987, Pat. No. 4,754,108.

[51] Int. Cl.$^4$ .................... H01H 11/00; H01H 11/02
[52] U.S. Cl. .................................. 29/622; 264/515; 264/516
[58] Field of Search .................. 29/622; 264/515, 516, 264/274; 73/308, 318; 417/297.5; 200/84 R, 81.9 HG

[56] References Cited

U.S. PATENT DOCUMENTS

| | | |
|---|---|---|
| 3,132,331 | 5/1964 | Boddy . |
| 3,304,353 | 2/1967 | Harautuneian ...................... 264/515 |
| 3,705,931 | 12/1972 | Confer et al. . |
| 3,791,098 | 2/1974 | Webster . |
| 4,086,457 | 4/1978 | Niedermeyer . |
| 4,139,750 | 2/1979 | Rau . |
| 4,215,089 | 7/1980 | Uhlig et al. . |
| 4,223,190 | 9/1980 | Olson . |
| 4,540,891 | 9/1985 | Keener et al. . |
| 4,587,074 | 5/1986 | De Loof . |
| 4,610,165 | 9/1986 | Duffy et al. ........................... 73/308 |
| 4,644,117 | 2/1987 | Grimes et al. ....................... 73/308 |

FOREIGN PATENT DOCUMENTS

2744404 4/1979 Fed. Rep. of Germany .

Primary Examiner—P. W. Echols
Attorney, Agent, or Firm—George Pappas

[57] ABSTRACT

A float switch assembly for selectively energizing and deenergizing a fluid pump or other electronic equipment responsive to the rise and fall of a fluid level within a reservoir and a method of manufacturing or assembling the float switch assembly. The assembly includes a hollow tube having an open end wherein a mercury tilt switch is fixed. A plurality of conductors covered with a non-conductive material extend within the tube open end and are connected to the switch so that a current path may be provided between the conductors responsive to the angle of the switch. Ridges are provided on the outer surface of the tube near the open end and, a float bulb is provided substantially surrounding the tube below the ridges and sealingly connected upon the ridges. A potting epoxy compound surrounds the switch and the conductors within the tube so that electrical contact with a fluid through the open end is prevented. A cap is placed on the tube open end and is locked into place. During the method of manufacture, the float bulb is flow molded directly onto the hollow tube by surrounding the tube with a resilient heated plastic, crimping the float bulb plastic upon the tube ridges and forcing air through the tube open end and two holes on the tube wall so as to enlarge the float bulb plastic to a desired float bulb shape.

18 Claims, 7 Drawing Sheets

METHOD OF MAKING A BLOW MOLDED FLOAT SWITCH ASSEMBLY

This is a division of application Ser. No. 027,360 filed Mar. 18, 1987, now U.S. Pat. No. 4,754,108.

BACKGROUND OF THE INVENTION

The present invention relates to a float switch assembly for selectively energizing and deenergizing a fluid pump or other electronic equipment responsive to the rise and fall of a fluid level within a reservoir. More specifically, the present invention relates to a float switch assembly which is substantially inexpensive and reliable and, the method of manufacturing or assembling the same.

Many applications require a mechanism by which the level of a fluid may be sensed and, as a result thereof, initiate an electrical apparatus, such as a fluid pump, or a fluid valve. One such application is in home sump reservoirs, generally found in basements and crawl spaces, whereat water unpredictably accumulates. Also, many industrial applications often require the level of a fluid to remain constant within a reservoir so as to, for example, retain a particular backup supply of fluid or a particular pressure at the bottom of the reservoir.

In the past, various water level sensing devices have been devised and utilized. One such prior art device, for example, is a float switch, as described in U.S. Pat. No. 4,540,891.

However, various problems have been associated with the prior art float switches. Some prior art float switches have been unreliable in that over time, the fluid in which they work, such as water, may leak within the float switch and come in contact with the electrical components thereof. This can be dangerous in that the short circuit created thereby could injure an individual coming in contact with the water if that individual is somehow in line with ground. Furthermore, a short circuit could render, for example, a water sump pump inoperable, thus, causing the pump not to dispose of the water and, thereby, possibly causing the basement or crawl space to become flooded.

Further yet, the float switches, in the past, have been substantially expensive to manufacture in that the assembly thereof was time consuming and the materials used in the manufacture were substantially expensive.

SUMMARY OF THE INVENTION

The float switch assembly, according to the present invention, is designed to overcome the above-discussed disadvantages associated with the prior art float switches. In essence, a float switch assembly is provided which is both substantially inexpensive and, yet, reliable.

More specifically, a float bulb is blow molded directly upon a hollow potting tube having one open end thereby sealing the closed end of the tube from contacting a fluid and, further, providing the necessary buoyancy with the air between the potting tube and within the float bulb. Ridges are provided on the outer surface of the potting tube whereupon the float bulb is crimped or pressed against, thereby creating a reliable seal between the potting tube and the float bulb. A mercury switch, which is electrically connected to two conductors, is fixedly mounted within the potting tube through the use of a potting epoxy compound or other known potting compound which surrounds the mercury switch, the conductors, the connection between the conductors and the mercury switch, a portion of the non-conductor portions of the conductors and the conductor sheathing. A potting tube cap, having an outer portion and an aperture wherethrough the conductors are received, is used to close off the open end of the potting tube and to also more rigidly hold the conductors exiting from the potting tube especially during the drying period of the potting epoxy. The potting tube cap is retained within the potting tube with two oppositely disposed substantially longitudinal legs, which are integral with the cap at one end thereof, and have a transversely pointing projection at substantially the other end thereof, which is adapted to be received within one of the oppositely disposed corresponding holes within the potting tube. The legs fit within two oppositely disposed longitudinal slots located on the inner surface of the potting tube and, further, the legs are molded so as to have a continual resilient force in the transverse direction thereby retaining the projections within their respective holes. A sufficient length of the conductors, covered with the non-conductor material and the sheathing, is provided between the float switch assembly and a rigid point upon which the conductors are mounted so that the float switch assembly may rise and fall with the fluid.

The present invention also relates to the process of manufacturing the float switch assembly which, in general, includes forming the potting tube by injection molding or other known process and, thereafter, blow molding the plastic float bulb on the potting tube. The blow molding is done by surrounding the tube below the ridges with a heated plastic and pressing or crimping the plastic upon the ridges and the outer surfaces substantially near the ridges thereby forming a neck portion and a seal between the potting tube and the float bulb, forcing air into the tube open end through the potting tube open end and through the holes within the potting tube walls thereby enlarging the plastic into a float bulb having the shape of the mold and, thereafter, cooling the plastic so that it may retain the shape of the mold. Thereafter, a mercury switch or other known tilt switch, which is connected to the conductors, is inserted within the potting tube and, potting epoxy compound is poured therearound. Finally, the potting tube cap is inserted within the potting tube until the projections of the legs are received within the holes of the potting tube thereby locking the cap in position.

In one form thereof, the present invention relates to a float switch assembly including a hollow tube having an open end, an outer surface, and a tilt switch fixed within the tube. A plurality of conductors, covered with a non-conductor, extend within the tube through the open end and, the conductors are connected to the switch so that a current path may be provided between the conductors responsive to the angle of the switch. A float bulb substantially surrounds the tube and is sealingly connected to the tube outer surface so that the tube portion, located within the bulb, is kept from contacting a fluid outside of the bulb. The float bulb also makes the assembly substantially buoyant. A sealing means is provided for sealing the switch and the connections between the switch and the conductors within the tube so that electrical contact with a fluid is prevented.

In one form thereof, the present invention relates to a float switch assembly in combination with a pump for selectively energizing and deenergizing the pump responsive to the rise and fall of a fluid. The float switch assembly includes a hollow tube having an open end, an outer surface and a mercury tilt switch fixed within the tube. A plurality of conductors, which are covered with a non-conductor, extend within the tube through the open end. The conductors have an exposed portion connected to the switch whereby a current path is provided between the conductors responsive to the angle of the switch. A float bulb is provided substantially surrounding the tube and sealingly connected to the tube outer surface whereby the tube portion within the bulb is kept from contacting a fluid outside of the bulb and, whereby the bulb makes the assembly substantially buoyant. A sealing means is provided for sealing the switch and, the connections between the switch and the exposed portions of the conductors and, also, the conductor exposed portions within the tube so that electrical contact with a fluid is prevented.

In one form thereof, the present invention relates to a float switch assembly in combination with a pump for selectively energizing and deenergizing the pump responsive to the rise and fall of a fluid. The float switch assembly includes a hollow tube having an open end, a closed end and an outer surface. A mercury tilt switch is fixed within the tube substantially near the closed end. A plurality of conductors, covered with a non-conductor, extend within the tube through the open end. The conductors have an exposed portion which is connected to the switch so that a current path may be provided between the conductors responsive to the angle of the switch. A ridge is provided on the tube outer surface substantially near the tube open end and surrounding the tube. A float bulb surrounds the tube portion below the ridge and is sealingly connected to the tube on the ridge and on the tube outer surface substantially near the ridge so that the tube portion within the float bulb is kept from contacting a fluid outside of the bulb and, so that the bulb makes the assembly substantially buoyant. A potting compound is provided within the tube substantially surrounding the switch, the connections between the switch and the exposed portions of the conductors, the conductor exposed portions and a portion of the non-conductors of the conductors.

In one form thereof, the present invention relates to a process of manufacturing a float switch assembly including the following steps: forming a tube having an open end, a closed end, inner and outer surfaces, a ridge on the outer surface of the tube substantially near the open end and, a hole in the tube substantially below the ridge; blow molding a plastic float bulb on the tube by surrounding the tube below the ridge with a heated plastic, pressing or crimping the plastic upon the ridge and the outer surface of the tube substantially near the ridge thereby forming a seal therearound, forcing air into the tube open end and through the tube hole thereby enlarging the plastic into a float bulb and cooling the plastic; inserting a mercury switch connected to a plurality of conductors covered with a non-conductor into the tube with the conductors extending out of the tube open end; placing potting epoxy compound into the tube open end thereby covering and sealing the mercury switch, the tube hole and the connections between the switch and the conductors within the tube, thereby preventing a fluid from contacting the mercury switch and the connections between the switch and the conductors and, thereby, also preventing a fluid from entering the float bulb through the tube hole.

In one form thereof, the present invention relates to a process of blow molding a bulb directly upon a tube having one open end and a hole disposed thereon. The process includes the steps of holding the tube on a retainer having an air passage for introducing air within the tube. Extruding a parison substantially surrounding the tube. Closing a mold upon the parison and the tube and connecting one end of the parison to the tube and closing the other end of the parison thereby making an airtight area between the parison and tube except for the hole. Air is then forced through the retainer air passage within the tube and through the tube hole to within the airtight area thereby pushing the parison outwardly so as to take the shape of the mold.

BRIEF DESCRIPTION OF THE DRAWINGS

The above-mentioned and other features and objects of this invention and the manner of attaining them will become more apparent, and the invention itself will be better understood by reference to the following description of embodiments of the invention taken in conjunction with the accompanying drawings wherein.

Corresponding reference characters indicate corresponding parts throughout the several views of the drawings.

The exemplifications set out herein are preferred embodiments of the invention in one form thereof and, such exemplifications are not to be construed as limiting the scope of the disclosure or the scope of the invention in any manner.

DESCRIPTION OF A SPECIFIC EMBODIMENT

Figure 1:
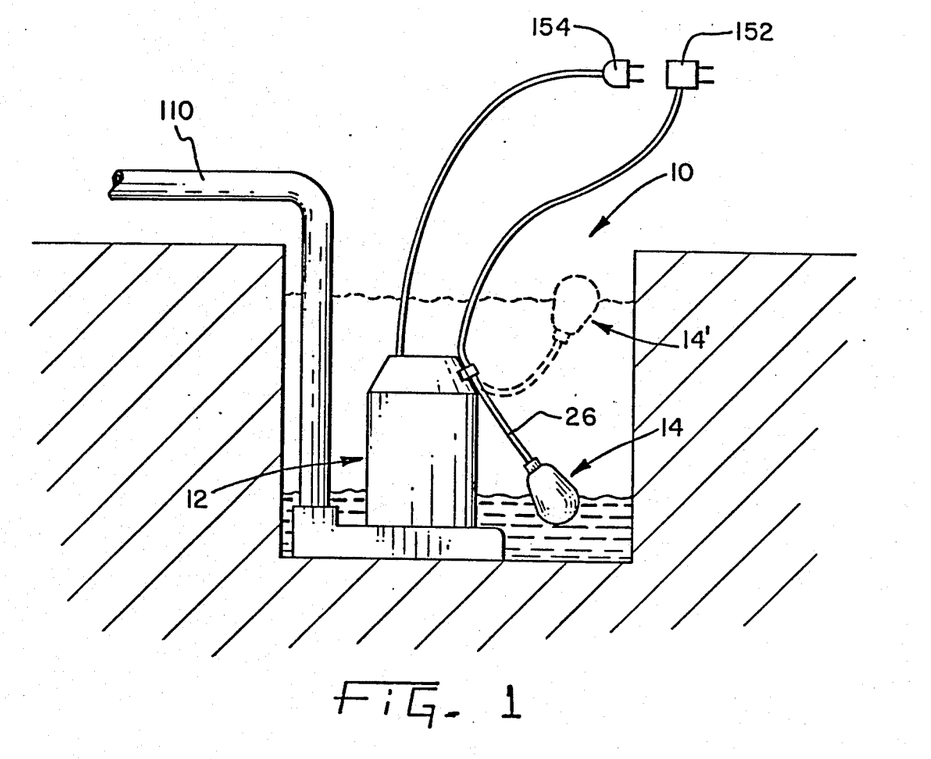
FIG. 1 is a sectional view of a sump hole showing a sump pump and a float switch assembly according to the present invention.

As shown in the drawings, a specific embodiment of the present invention is a float switch assembly generally indicated as 14. Float switch assembly 14, as shown in FIG. 1, is used in combination with submersible sump pump 12, within sump hole 10, so as to selectively energize and deenergize sump pump 12 responsive to the rise and fall of the water as indicated with solid and dashed lines. In general, when the level of water within sump hole 10 drops to the level shown by the solid lines, float switch assembly 14 is situated at an angle whereby sump pump 12 is not operated. However, when the water level within sump hole 10 rises, as shown by the dashed lines, the float switch assembly is caused to tilt, due to its buoyancy as indicated by 14' thereby as described hereinbelow, energizing sump pump 12 and, thus, causing the water within sump hole 10 to be discharged via pipe 110. As can be appreciated, the float switch assembly may be utilized with other fluids and reservoirs also subject to varable flow conditions so as to activate an electrical component such as a pump, a valve, or an alarm.

Float switch assembly 14, in general, includes hollow potting tube 18, tilt switch or a mercury-type tilt switch 20, float bulb 16 surrounding potting tube 18, conductors 22 electrically connected to mercury switch 20, non-conductor materials 24 and 26, and a sealing means including a potting epoxy compound 27 and a potting tube cap 28.

Figure 3:
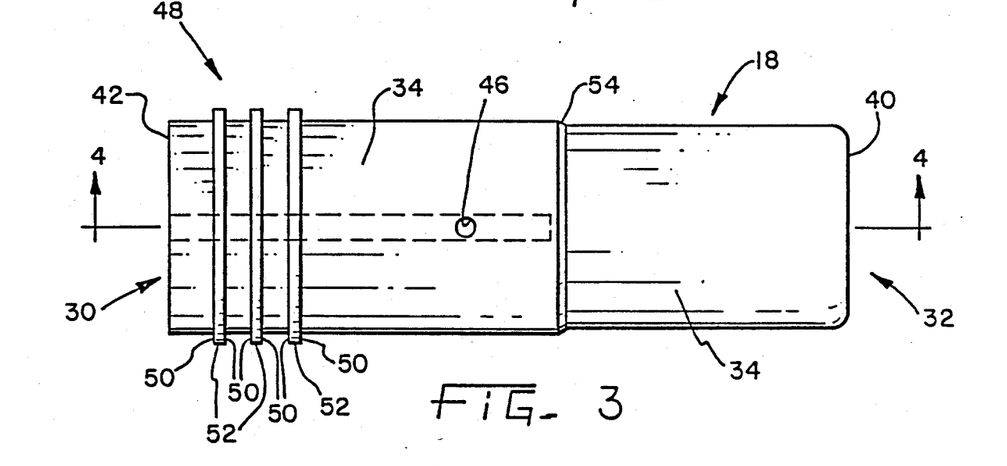
FIG. 3 is a side elevational view of the potting tube shown in FIG. 2 according to the present invention.
Figure 4:
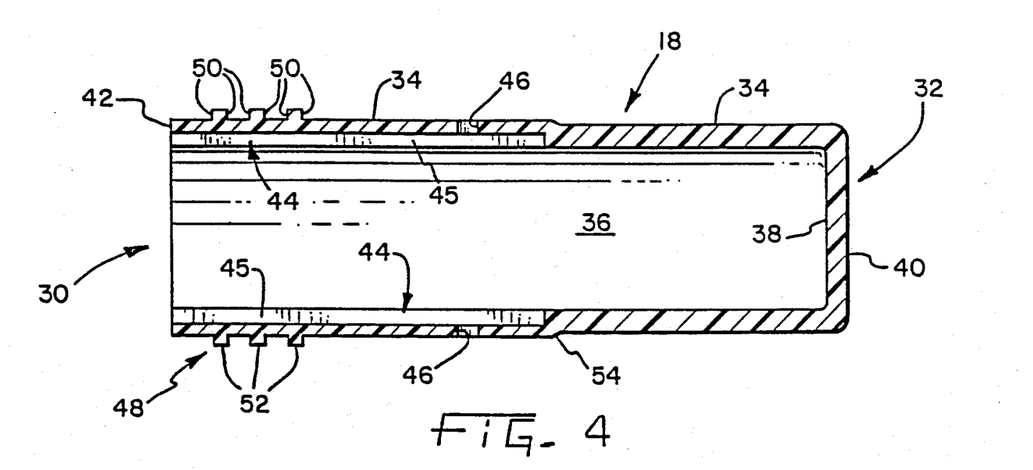
FIG. 4 is a cross-sectional view of the potting tube shown in FIG. 3 taken along line 4—4.
Figures 5, 6, 7, 8:
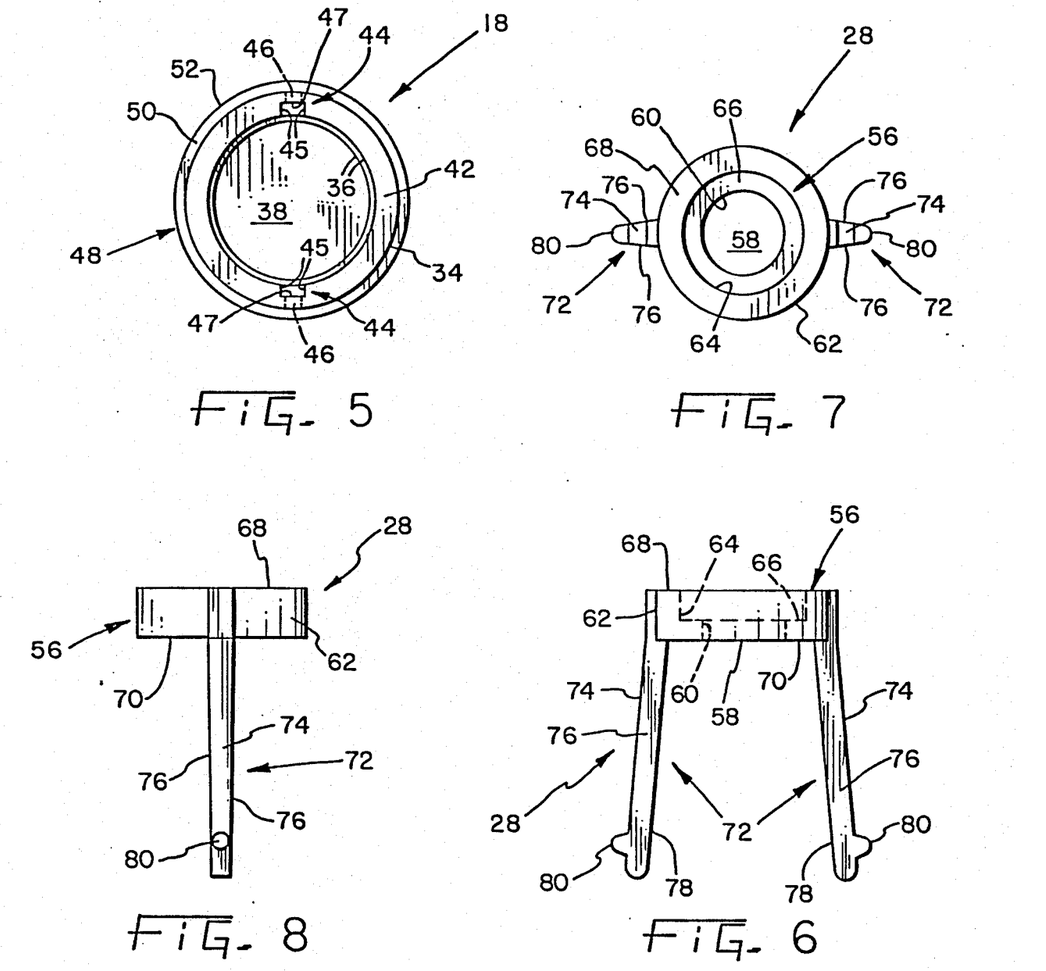
FIG. 5 is a top plan view of the potting tube shown in FIG. 3.
FIG. 6 is front elevational view of the potting tube cap shown in FIG. 2 outside of a potting tube according to the present invention.
FIG. 7 is a top plan view of the cap shown in FIG. 6.
FIG. 8 is a side elevational view of the cap shown in FIG. 6.
Figure 9:
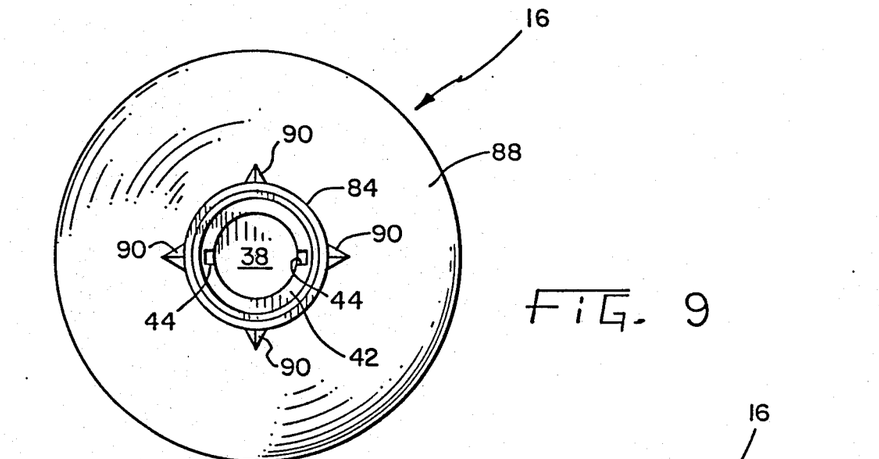
FIG. 9 is a top plan view of the potting tube and float bulb assembly shown in FIG. 2.

As shown in FIGS. 3-5, potting tube 18 is hollow and has an open end 30 and a closed end 32 longitudinally opposite open end 30. Potting tube 18 has an outer surface 34 and an inner surface 36. Closed end 32 is integral with potting tube 18 and has a closed bottom inner surface 38 and a closed bottom outer surface 40. Lip surface area 42 is provided at open end 30 thereof.

Potting tube 18, as shown, is generally cylindrical and has an inner diameter that tapers from largest to smallest longitudinally from open end 30 to closed end 32. Two longitudinal slots 44 are provided on the inner surface 36 of tube 18. Slots 44 extend from the lip surface area 42 to approximately the middle portion of tube 18 or to substantially near outer frusto-conical section 54. Two holes 46 are provided through the wall of tube 18 substantially at the bottom of slots 44 near the middle portion of tube 18. It should also be noted that the longitudinal slots 44, which are disposed on the interior of tube 18, and holes 46 are radially oppositely disposed with one another as shown in FIGS. 4 and 5.

On the outer surface 34 of potting tube 18, substantially near lip 42, there are provided ridges which are generally indicated as 48. Ridges 48 encircle tube 18 and are substantially square-shaped as shown. Ridges 48 include side surfaces 50 which are generally perpendicular to tube 18 and top surfaces 52, which are perpendicular to side surfaces 50, and parallel with tube 18. As more clearly shown in FIGS. 3 and 4, the upper greater diameter portion of tube 18 is joined with the bottom smaller diameter portion with a frusto-conical section 54. It should also be noted that potting tube 18, in its preferred embodiment, is made of acrylonitrile butadine styrene (ABS) plastic, and is made by injection molding.

Figure 2:
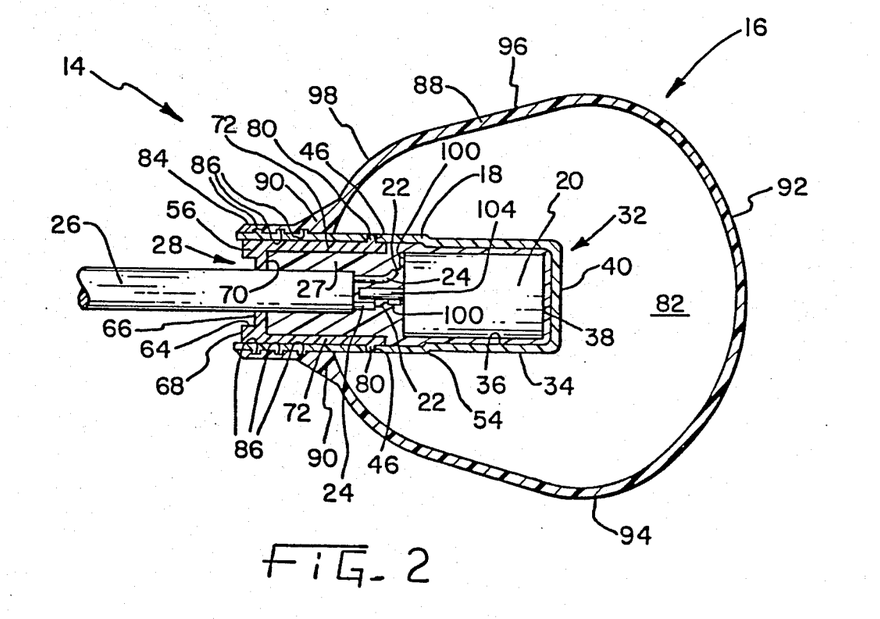
FIG. 2 is a cross-sectional view of the float switch assembly of FIG. 1.

Potting tube cap 28, which is received within potting tube 18, and which is used to aid in retaining mercury switch 20 initially within potting tube 18 and to more rigidly hold in place the non-conductor sheathing 26 of conductors 22 during the drying period of potting epoxy compound 27 will be described hereinbelow. Tube cap 28 has an upper disk-like section including an outer portion generally indicated as 56 and an aperture 58 substantially concentrically situated within outer portion 56. Aperture 58 has a surface diameter 60 of sufficient size so that conductors 22, non-conductor portions 24 and non-conductor sheathing 26 are received therethrough as shown in FIG. 2. Outer portion 56 is substantially L-shaped, as shown in FIGS. 6 and 7, and includes an outer radial surface 62, an inner radial surface 64, a ledge annular surface 66, an upper annular surface 68 and, a lower annular surface 70. Slots 44 are substantially square-shaped having sides 45 and valley surface areas 47. Radial surface 62 has a diameter slightly smaller than the inner diameter of the upper greater diameter portion of tube 18 such that cap 28 will fit within tube 18 as shown in FIG. 2.

Two legs, generally indicated as 72, are connected to outer portion 56 of tube cap 28 and extend generally downwardly as shown in FIG. 6. Legs 72 are substantially radially oppositely disposed and have an outer surface 74, sides 76, and an inner surface 78. A radial projection 80 is located on each of outer surfaces 74 near substantially the end of legs 72, as shown.

Potting tube cap 28 is made of ABS plastic and is injection molded. In this regard, sides 76 of legs 72 are tapered as shown in FIG. 8 so that cap 28 may be readily removed from the mold after injection. Legs 72 are resilient and are molded, as shown in FIG. 6, at a slight angle radially outwardly from the longitudinal so that projections 80 and legs 72 are subject to a force transverse from the longitudinal whenever legs 72 are deformed in a position substantially parallel to the longitudinal. In this manner, when cap 28 is inserted within tube 18, as shown in FIG. 2 with legs 72 sliding within slots 44, projections 80 are forced transversely outwardly within holes 46 thereby locking cap 28 within tube 18.

Float bulb 16 is provided surrounding potting tube 18 thereby preventing a fluid, such as water, from coming in contact with potting tube 18 and, further, providing the necessary buoyancy so that float switch assembly 14 will float at an angle as shown in FIG. 1 whenever a predetermined quantity of fluid is within a reservoir such as a sump. This, thereby, also places mercury switch 20 at an angle whereby a current path may be provided between conductors 22.

More specifically, float bulb 16 is blow molded directly upon potting tube 18 substantially near open end 30 as shown in FIG. 2. That is, float bulb 16 is made of a polyethylene plastic which is heated to an elastic or resilient state so that the plastic may be crimped upon ridges 48 and the tube outer surface 34 substantially near and between ridges 48. In this fashion, a seal is provided between float bulb 16 and potting tube 18 so that a fluid will not enter the inner area 82 of float bulb 16 through the sealed connection between float bulb 16 and potting tube 18.

Float bulb 16 includes a cylindrical neck portion 84, the inner diameter of which has annular substantially square recesses 86 in which there are tightly received ridges 48 of potting tube 18. Neck portion 84 is integrally connected to the blow molded bulb portion 88. Strengthening triangular ribs 90 are integrally connected between neck portion 84 and blow molded bulb portion 88 so as to more rigidly keep blow molded bulb portion 88 longitudinal with respect to neck portion 84. Blow molded bulb portion 88, as shown in FIGS. 1, 2, 9 and 10, is oblong spheroid-shaped. That is, blow molded bulb portion 88 has a spherical portion 92, a maximum diameter portion 94, an elongate straight portion 96, and a smaller diameter curved portion 98.

In a second embodiment, as shown in FIG. 11, float bulb 16 again includes a neck portion 84 and a blow molded bulb portion 8. However, in this embodiment, blow molded bulb portion 88 is substantially spherical-shaped as shown and, further, does not include the strengthening triangular ribs 90 as used in the embodiment described hereinabove.

Figure 2A:
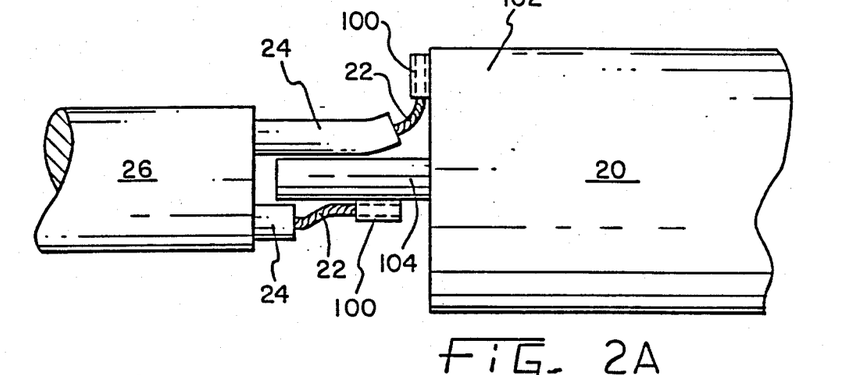
FIG. 2a is a blown up portion of the cross-sectional view shown in FIG. 2 showing the connections between the switch and the conductors.

FIG. 2a shows the preferred method of connecting conductors 22 to mercury switch 20. More specifically, conductors 22 have weld clips 100 crimped thereupon in a known and customary fashion. Thereafter, one of weld clips 100 is welded directly onto the body 102 of mercury switch 20 and, the other weld clip 100 is directly welded onto the electrode 104 of mercury switch 20.

Figures 10, 11:
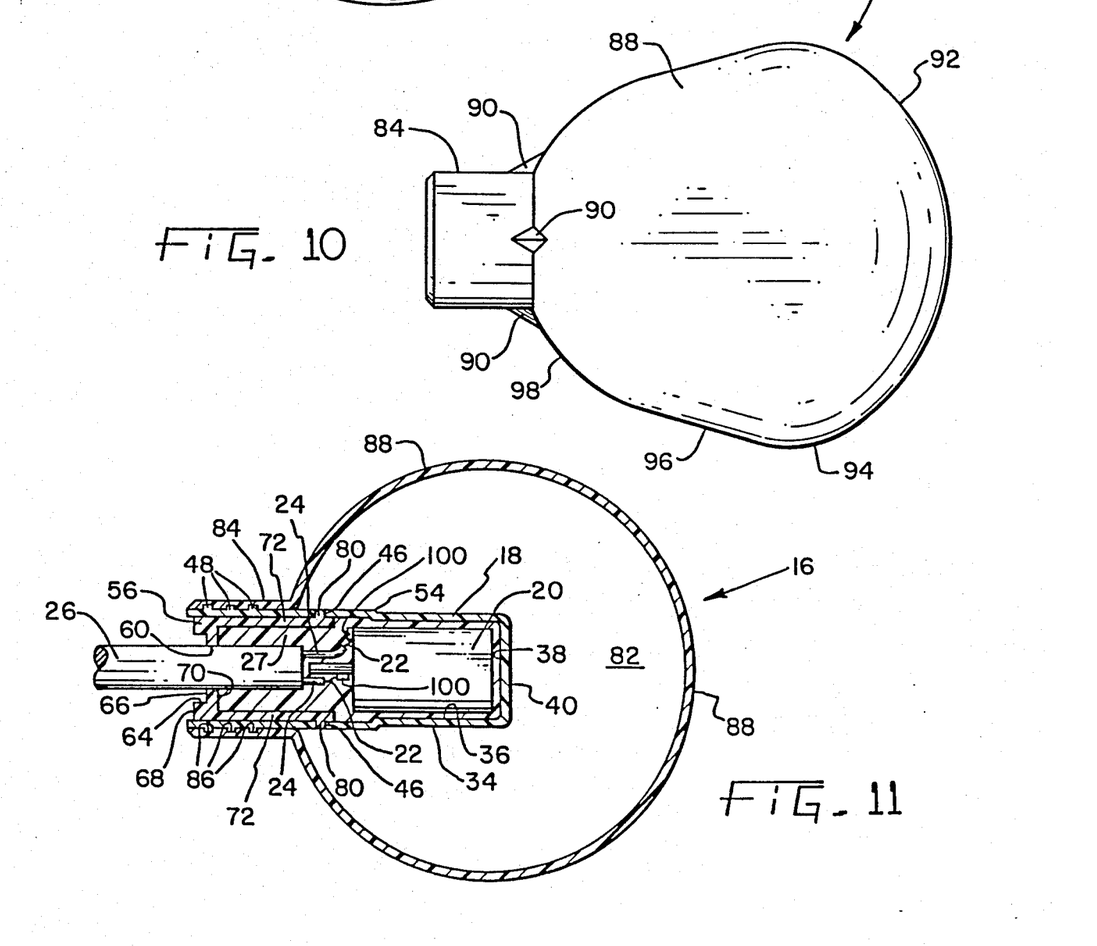
FIG. 10 is a side elevational view of the float bulb shown in FIG. 9.
FIG. 11 is a cross-sectional view of a second embodiment of a float switch assembly according to the present invention.

A sealing means, generally including the potting epoxy compound 27 and the potting tube cap 28, is provided for sealing mercury switch 20, the exposed portions of conductors 22, weld clips 100 and a portion of non-conductors 24 and non-conductor sheathing 26 within tube 18. In this fashion, mercury switch 20 is retained within tube 18 and electrical contact with a fluid, such as water, is prevented. Potting epoxy compound 27, as described hereinbelow, is poured or forced within tub 18 so as to surround and sufficiently come in contact with all the components within potting tube 18, as shown in FIGS. 2 and 11.

Figure 13A:
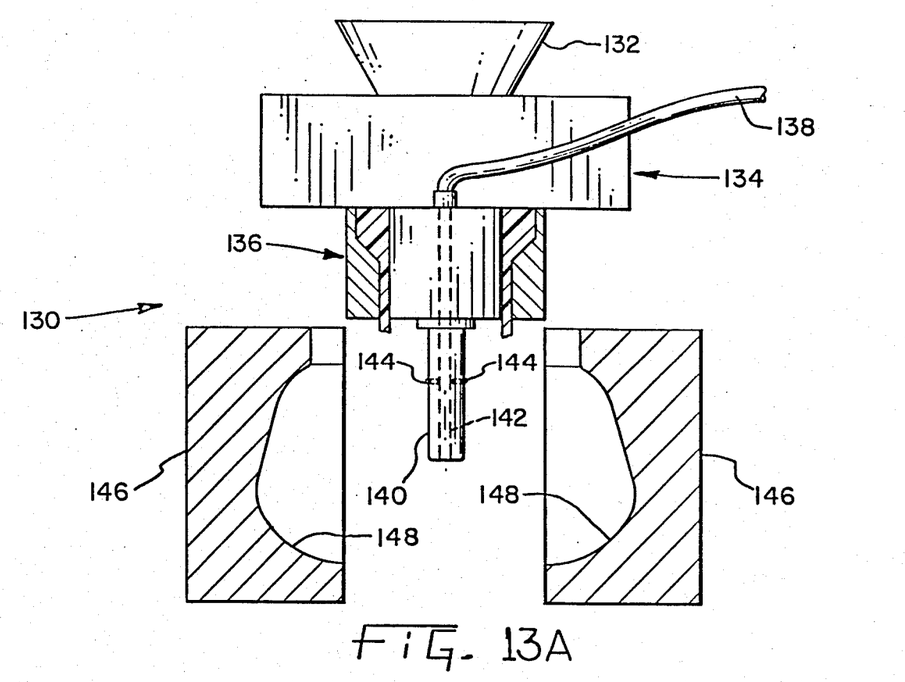
Figure 13B:
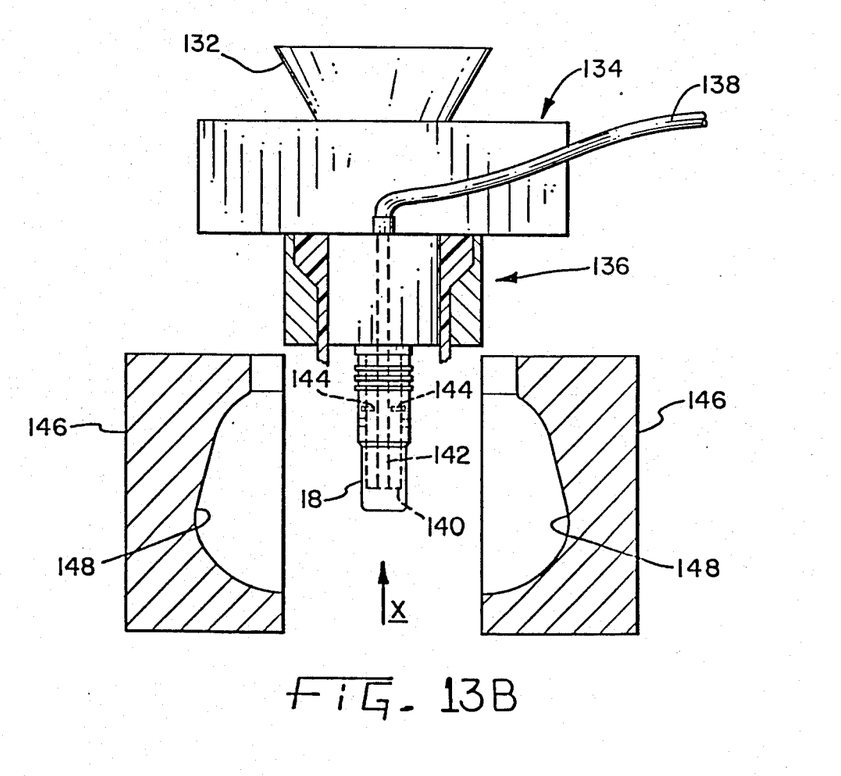

The process of assembling or manufacturing the float switch assembly will be described hereinbelow. At the outset, potting tube 18, as described above, is injection molded. Thereafter, float bulb 16 is blow molded directly onto potting tube 18, as more clearly shown in FIGS. 13a–13e. More specifically, as shown in FIG. 13a, a ram accumulator blow molder generally indicated as 130, is utilized. Blow molder 130 includes a hopper 132, extruder and ram accumulator generally indicated in block diagram form as 134, die head 136 and an air supply hose 138 leading to substantially the center of die head 136. A potting tube retainer or blow pin 140 is connected to substantially the center of die head 136 and, has a longitudinal air opening 142 communicating with air supply hose 138. Potting tube retainer 140 includes ball and spring assemblies 144 for frictionally holding thereon potting tube 18 as shown in FIG. 13b. Blow molder 130 further includes mold halves 146 having a mold shape 148, here shown as an oblong spheroid.

Figure 13C:
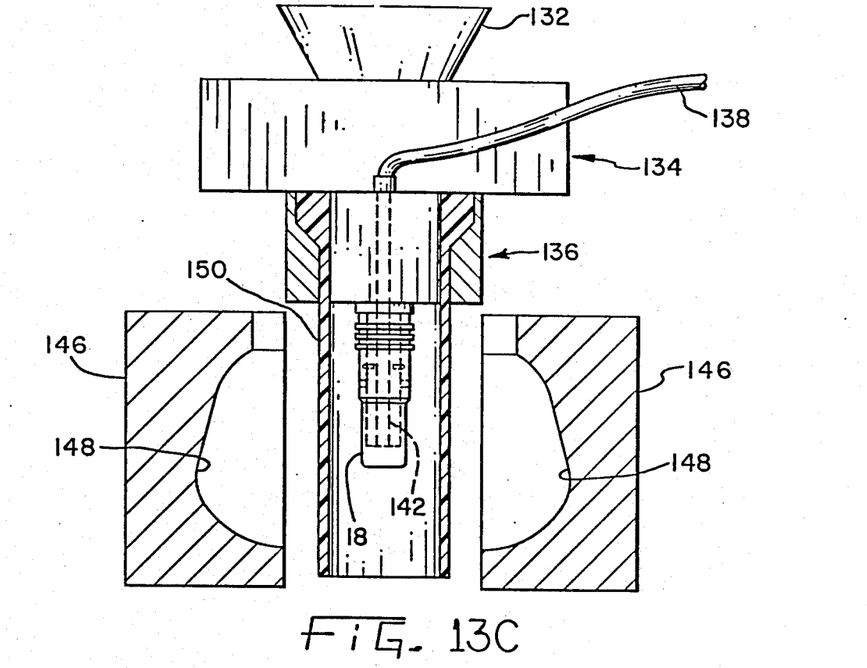
Figure 13D:
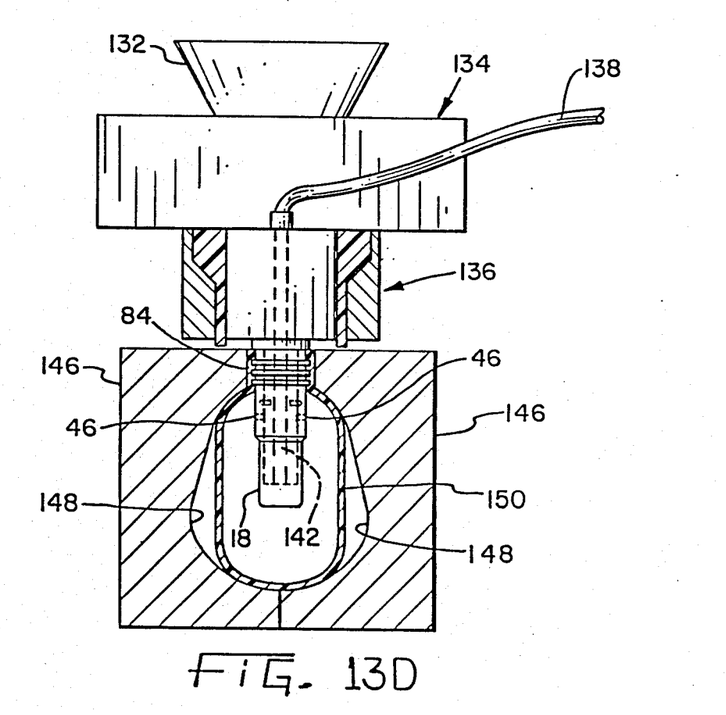
Figure 13E:
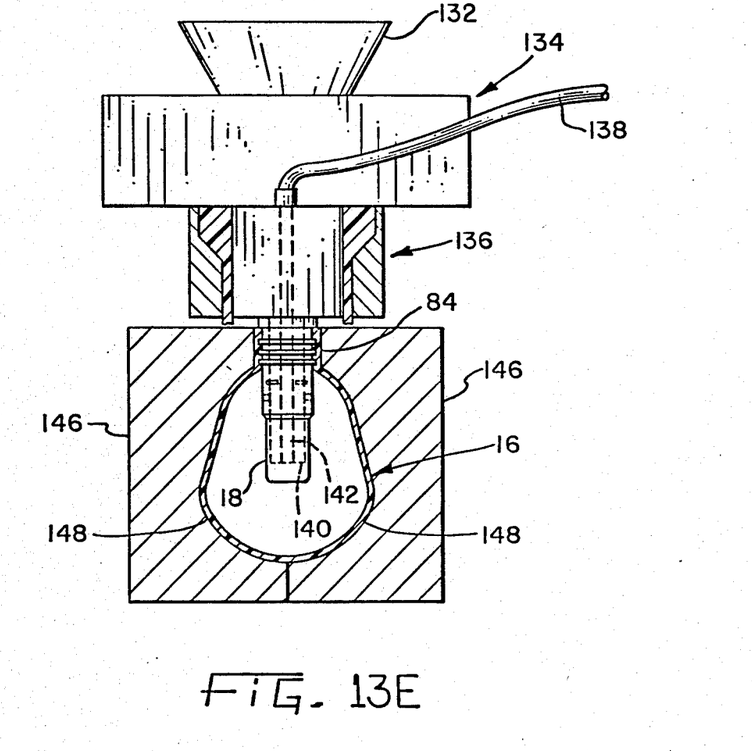

The next step in the manufacture of the float switch assembly is the blow molding of float bulb 16 upon potting tube 18 through the use of blow molder 130 and assembly thereof. As shown in FIG. 13b, potting tube 18 is placed upon potting tube retainer 140 by slipping potting tube 18 thereon in the direction indicated by arrow X. As described above, potting tube 18 is frictionally held upon potting tube retainer 140 via ball and spring assemblies 144. Thereafter, as shown in FIG. 13c, parison 150, which is substantially cylindrically-shaped molten-heated polyethylene plastic, is fed within mold halves 146 through die head 136 through the use of the extruder and ram accumulator assembly 134. As shown in FIG. 13c, parison 150 now substantially surrounds potting tube 18 and is ready for molding. Now, as shown in FIG. 13d, mold halves 146 are forced together upon parison 150 cutting away parison 150 from die head 136 and crimping or pressing the molten polyethylene against the upper portion of tube 18 and, against ridges 48 and on the outer surface area near ridges 48 thereby forming the neck portion 84 of float bulb 16. Through this step, a seal is formed between tube 18 and float bulb 16. It should be noted that during this step, the bottom portion of parison 150 is also crimped together thereby forming an air tight body between the potting tube 18 and parison 150, except for holes 46. Finally, as shown in FIG. 13e, air is forced through air supply hose 138, longitudinal air opening 142 to within potting tube 18, between potting tube retainer 140 and potting tube 18 and, through air holes 46 to the interior of the parison, thereby forcing the molten polyethylene outwardly and, forcing it to take mold shape 148. Thereafter, mold halves 146 are separated and potting tube 18, along with the now formed float bulb 16, are slipped off retainer 140 and the fish tails of the mold process are cleaned from float bulb 16 in a known and customary fashion.

It should be noted that during the cooling down process of float bulb 16, neck portion 84, via its decreasing temperature, tends to form yet more tightly against potting tube 18, thereby creating a yet better seal between potting tube 18 and float bulb 16. After the cooling process, the polyethylene plastic retains the shape of the mold in a known and customary manner.

In a separate operation, conductors 22 are first exposed by stripping a portion of non-conductors 24 and non-conductor sheathing 26. Thereafter, weld clips 100 are crimped on the exposed portions of conductors 22. Conductors 22 and non-conductors 24 and 26 are slipped through cap aperture 58 and weld clips 100 are spot welded directly onto the body 102 and the electrode 104 of mercury switch 20.

Thereafter, a small portion of potting epoxy compound 27 is poured within potting tube 18 on the bottom inner surface 38 and switch 20, along with the now connected conductors 22, is inserted within tube 18 thereby forcing the potting epoxy compound 27 up and around mercury switch 20. Thereafter, more potting epoxy compound 27 is poured into potting tube 18 around non-conductors 24, non-conductor sheathing 26, conductors 22, weld clips 100 and switch 20. It should be noted that at this point, a small portion of potting compound 27 enters holes 46 and a minute portion may come in contact with outer surface 34 of tube 18.

Legs 72 are then forced in a substantially parallel longitudinal position or at an angle radially inwardly from the longitudinal, and cap 28 is inserted within tube 18 by sliding legs 72 within slots 44 until radial projections 80 reach holes 46. At that point, the resilient force of legs 72 force the radial projections 80 within holes 46 and legs 72 in a longitudinal position within slots 44 such that cap 28 is locked within tube 18. It should be noted that the potting epoxy compound 27, throughout this operation, surrounds legs 72 and radial projection 80 within holes 46 (actually plugging holes 46), along with non-conductors 24 and non-conductor sheathing 26 up to and including within aperture 58. Cap 28, during this operation, aids in retaining conductors 22 substantially concentrically within potting tube 18. Thereafter, potting epoxy compound 27 is allowed to dry and, accordingly, water and other fluids are prevented from entering tube 18 through open end 30, thereby preventing a fluid from contacting switch 20, the exposed portions of conductors 22 and weld clips 100.

Finally, non-conductor sheathing 26 is connected to a fixed point with respect to the rising and falling fluid as shown in FIG. 1 so that float bulb 16 may rise and fall with the fluid and situate itself in the proper angles at the different fluid levels. In this fashion, mercury switch 20 within float bulb assembly 16 selectively energizes and deenergizes sump pump 12 thereby keeping the fluid within a reservoir such as sump hole 10 at a substantially constant level.

Figure 12:
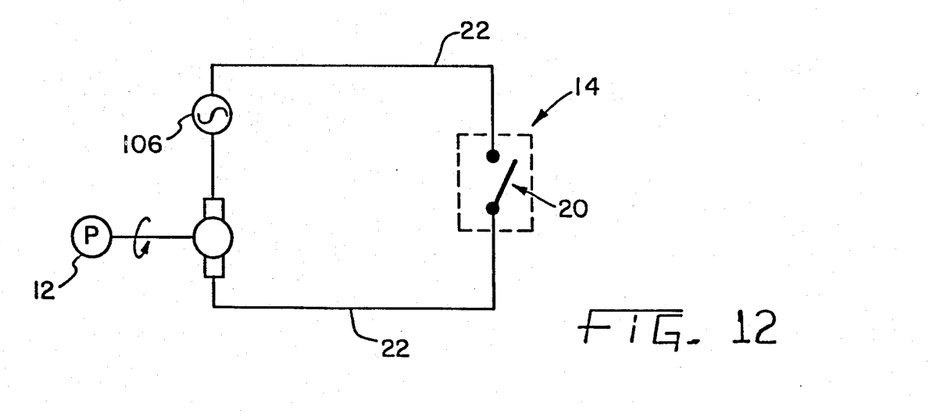
FIG. 12 is an electrical schematic showing one application of the float switch assembly according to the present invention; and, FIGS. 13a–13e show various steps through which a float bulb is blow molded directly on the potting tube according to the present invention.

Accordingly, as shown diagrammatically in FIG. 12, when an alternating current source 106 is connected to sump pump 12, in series with mercury switch 20, sump pump 12 is selectively energized, depending on the position of switch 20. That is, also referring to FIG. 1, when the level of water is low as indicated by solid lines, float bulb assembly 14 is situated at an angle such that switch 20 is open, thereby preventing current flow through the motor winding and, thus, keeping sump pump 12 off. However, when water enters sump hole 10 as indicated by the dashed line, float switch assembly 14 floats on the surface of the water and is situated at a different angle, as indicated by 14' in FIG. 1, whereat switch 20 is caused to close thereby energizing sump pump 12 and causing the water to exit sump hole 10 through outlet pipe 110 in a known and customary fashion. Sump pump 12 remains energized until the water level within sump hole 10 drops to a level whereat the angle of the float switch assembly 14 causes mercury switch 20 to open and, thus, deenergize sump pump 12. As can be appreciated, float switch assembly 14, as described hereinabove, provides an inexpensive and yet reliable manner through which a pump may be energized and deenergized in response to the rise and fall of a fluid within a reservoir.

It should be further noted that float switch assembly 14 may be connected to what is commonly known as a piggyback plug 152 for selectively providing electrical current to an appliance plugged in thereto. More specifically, as shown in FIG. 1, sump pump 12, having a regular plug 154, may be plugged into piggyback plug 152 so that power may be provided to sump pump 12 responsive to the rise and fall of float switch assembly 14. As can be appreciated, through the use of piggyback plug 152, float switch assembly 14 may be utilized with various electrical components which are to be energized and deenergized due to the rise and fall of float switch assembly 14.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A process of manufacturing a float switch assembly comprising the steps of:
    forming a tube having an open end, a closed end, inner and outer surfaces, a ridge on the outer surface of said tube substantially near said open end and a hole in said tube substantially below said ridge;
    bowl molding a plastic float bulb on said tube by surrounding said tube below said ridge with a heated plastic, pressing said plastic upon said ridge and the outer surface of said tube substantially near said ridge thereby forming a seal therearound, forcing air into said tube open end and through said tube hole thereby enlarging said plastic into a float bulb and cooling said plastic;
    inserting a mercury switch connected to a plurality of conductors covered with a non-conductor into said tube, said conductors extending out of said tube open end; and,
    placing potting epoxy compound into said tube open end thereby covering and sealing said mercury switch, said tube hole and said connections between said switch and said conductors within said tube thereby preventing a fluid from contacting said mercury switch and said connections between said switch and conductors and preventing a fluid from entering said float bulb through said tube hole.

2. The process of claim 1 wherein, in the step of forming, a plurality of holes are formed in said tube below said ridge and further comprising, after the step of pouring, the step of placing a cap having an outer portion and an aperture wherethrough said conductors are received, and having a plurality of legs connected to said outer portion and radial projections on said legs, on said tube open end by inserting said legs longitudinally within said tube and said radial projections tangentially within said tube holes.

3. The process of claim 2 wherein in the step of forming, a plurality of longitudinal slots on the inner surface of said tube extending from said tube open end are formed and wherein, during the step of placing said cap on said tube, said legs are received and slide within said slots.

4. A process of manufacturing a float switch assembly comprising the steps of:
    blow molding a plastic float bulb on a tube having a first open end, a second end, and a hole substantially near the second end by surrounding said tube substantially below said tube open end with a heated plastic, pressing said plastic upon said tube near said open end and forcing air into said tube open end and through said tube hole thereby enlarging said plastic into a float bulb, and, inserting a switch connected to a plurality of conductors within said tube through said tube open end.

5. The process of claim 4 further comprising, after the step of inserting, the step of pouring potting epoxy compound into the tube open end and sealing said switch and said tube open end thereby preventing fluid from contacting said switch.

6. The process of claim 5 wherein during the step of pouring potting epoxy compound into said tube open end, a portion of the conductors connected to said switch are also covered and sealed.

7. The process of claim 5 further comprising after the step of pouring, the step of placing a cap having an outer portion and an aperture on the tube open end, the conductors being received through the aperture.

8. The process of claim 4 further comprising after the step of inserting, the step of placing a cap having an outer portion and an aperture on the tube open end, the conductors being received through the aperture.

9. The process of claim 4 further comprising the step of forming the tube by injection molding prior to the step of blow molding.

10. The process of claim 4 further comprising, prior to the step of inserting, the step of cooling the heated plastic.

11. A process of manufacturing a float switch assembly comprising the steps of:
    blow molding a plastic float bulb on a tube having a first open end and a second end and a hole substantially near the second end by holding the tube on a retainer having an air passage for introducing air within the tube, extruding a parison substantially surrounding the tube, closing a mold upon the parison and tube and connection one end of the parison to the tube and closing the other end of the parison thereby making and air tight area between the parison ant the tube except for the tube hole, and forcing air through the retainer within the tube and through the tube hole within the air tight area and pushing the parison outwardly so as to take the shape of the mold; and, inserting a switch connected to a plurality of conductors within the tube through the tube open end.

12. The process of claim 11 further comprising, after the step of inserting, the step of pouring potting epoxy compound into the tube open end and sealing said switch and said tube open end thereby preventing fluid from contacting said switch.

13. The process of claim 12 wherein during the step of pouring potting epoxy compound into said tube open end, a portion of the conductors connected to said switch are also covered and sealed.

14. The process of claim 12 further comprising after the step of pouring, the step of placing a cap having an outer portion and an aperture on the tube open end, the conductors being received through the aperture.

15. The process of claim 11 further comprising after the step of inserting, the step of placing a cap having an outer portion and an aperture on the tube open end, the conductors being received through the aperture.

16. The process of claim 11 further comprising the step of forming the tube by injection molding prior to the step of blow molding.

17. The process of claim 11 wherein the extruded parison is made of heated plastic.

18. The process of claim 17 further comprising after the step of pushing, the step of opening the mold and cooling the plastic parison.

* * * * *